United States Patent [19]

Gould et al.

[11] Patent Number: 4,497,840
[45] Date of Patent: Feb. 5, 1985

[54] CEREAL FOODS MADE FROM OATS AND METHOD OF MAKING

[75] Inventors: Max R. Gould, Homosassa Springs, Fla.; David P. Bone; Fu H. Hsieh, both of Palatine, Ill.

[73] Assignee: The Quaker Oats Company, Chicago, Ill.

[21] Appl. No.: 525,670

[22] Filed: Aug. 23, 1983

Related U.S. Application Data

[63] Continuation of Ser. No. 278,167, Jun. 29, 1981, abandoned.

[51] Int. Cl.$^3$ ............................ A23J 1/12; A23B 4/04
[52] U.S. Cl. .................................. 426/560; 426/457; 426/463; 426/619; 426/620
[58] Field of Search ............... 426/456, 457, 463, 464, 426/560, 618, 620, 621, 619

[56] References Cited

U.S. PATENT DOCUMENTS

| 1,170,162 | 2/1916 | Kellogg | 426/463 X |
| 2,355,028 | 8/1944 | Musher . | |
| 2,355,029 | 8/1944 | Musher | 252/1 |
| 2,355,033 | 8/1944 | Musher | 106/154 |
| 2,414,117 | 1/1947 | Musher | 252/1 |
| 2,466,260 | 4/1949 | Musher | 241/11 |
| 2,466,261 | 4/1949 | Musher . | |
| 2,554,869 | 5/1951 | Musher . | |
| 4,028,468 | 6/1977 | Hohner et al. | 426/463 X |
| 4,175,124 | 11/1979 | Hyldon | 426/180 |

FOREIGN PATENT DOCUMENTS 1552012  9/1979  United Kingdom .

OTHER PUBLICATIONS

Breakfast Cereal Tech. Noyes Data Corp. "Dough-cooking and Extrusion Process" 1974, pp. 2-36.
Breakfast Cereal Tech. Noyes Data Corp. "Quick Cooking Oats" pp. 140-153, 1974, Other Quick Cooking Cereals, pp. 154-180.
"Bio Functional Properties of Oats" Max Gould for Symposium, Cereals for Food Beverages, Pub. 1979 © 1980, Academic Press Inc.
Saturday Evening Post "Or Perchance to Prevent A Coronary and Bypass" pp. 114, 115, 117, 122 and 123, Feb. 1980.

Primary Examiner—Robert Lindsay
Attorney, Agent, or Firm—Neuman, Williams, Anderson & Olson

[57] ABSTRACT

Cereal food products are prepared from oat bran which is a portion of the oat groat which contains at least 150% more crude fiber than the whole oat groat and contains increased levels of protein, gum, fat and ash than the whole oat groat.

15 Claims, No Drawings

CEREAL FOODS MADE FROM OATS AND METHOD OF MAKING

This application is a continuation of application Ser. No. 278,167 file June 29, 1981 now abandoned.

This invention relates to food products and more particularly to food products derived from oats.

The value of oat grains (groats) as food has long been appreciated. Oat groats are high in protein, of good quality and are a good source of vitamins and minerals, such as thiamin, iron and phosphorous. However, difficulties are encountered in the production of oat food products having desired qualities from the standpoint of the consumer. For example, oat foods have a tendency when cooked to paste or form lumps which detract from the mouthfeel characteristics and the cooked oat foods tend to stick to cooking utensils making the cleaning thereof difficult.

It is a principal object of this invention to provide from oats food products having desired organoleptic properties.

It is another object to provide oat food products of good nutritional value which can be cooked without substantial pasting or lumping.

It is another object to provide methods for producing from oats ready-to-eat cereal foods.

It is another object of the invention to provide cereal food products from oats which are readily hydratable with both hot and cold water.

It is still another object of this invention to produce from oats ready-to-eat type cereal foods having desirable attributes from the standpoint of structural integrity and maintenance of crispness.

In accordance with this invention, breakfast cereal type food products are produced from a particular portion of the oat groat, which portion, compared to the whole oat groat, is enriched in protein, crude fiber, dietary fiber and gum content. The portion of the oat groat used in accordance with this invention is an oat bran concentrate referred to herein as oat bran. The oat bran as used herein is a fraction obtained from whole oat groats which contains at least 150% more crude fiber than the whole groat and contains increased levels of protein, gum, fat and ash than the whole oat groat.

In the milling of various cereal grains, the morphology of the respective grains influences the extent to which the bran layers can be separated from the endosperm layers. The morphology of wheat, for example, makes it relatively easy to obtain an almost clean separation of the wheat bran from the wheat endosperm. The morphology of oats may be regarded as in the other end of the spectrum because it is virtually impossible, by the best milling procedures, to disengage the bran or aleurone layer materials from the adhering endosperm material. The oat fraction used herein consists of a rich, if not the richest, concentrate of the oat bran layers which can be industrially produced in a practical manner. Hence, this oat bran concentrate is referred to simply as the oat bran fraction or "oat bran".

A presently preferred procedure for obtaining the oat bran involves steaming dehulled, whole, dried or green oat groats which generally contain on the order of 10–12% moisture for a suitable period to inactivate lipase activity. Generally, steaming the green oat groats is satisfactorily achieved by steaming the oats in suitable steaming equipment at temperatures of about 210°–215° F. and pressures of about 14.7 to 18 psia for a period of about 10 to 12 minutes. After steaming, the oat kernels are passed through "bump" rolls with the clearance between the rolls being sufficient to break or fracture the kernels but insufficient to roll the oat kernels. In this step, "bump" rolls such as rotating Ross Rolls having a clearance between the rolls of about 0.009 to 0.016 inch are generally satisfactory.

The oat kernels can then be cooled, if necessary or desired, and are then ground in a suitable mill such as a Fitz mill or a hammer mill or other known grinding mills. The grinding or milling operation is conducted so as to obtain a fine oat fraction or oat flour and the oat bran fraction. The fine oat fraction comprises small regular shaped spherical particles which basically originate from the starch endosperm and are smaller in size than the oat bran particles. The oat bran comprises more irregularly shaped particles which largely originate from the bran layer or from the endosperm near the bran layer. Particles containing the bran particles or multiple starch granules cemented together by oat gum or protein tend to be less dense and/or more irregularly shaped than the free starch particles from the starch endosperm which tend to be dense and compact. The oat bran contains particles which are of a size larger than the fine oat fraction.

The oat bran desired for use according to this invention is separated from the fine oat fraction or oat flour by any suitable means such as screening, sifting, air classification and so forth.

The size of the openings in the grinding screens affects the yield of oat bran obtained from the oat groats. If the grinder screen openings are excessively small in size, less oat flour can be separated from the oat bran. Conversely, if the grinder screen openings are excessively large, the efficiency of the separation of the oat gran and oat flour is reduced. The grinder screen employed is one having openings of a size which afford maximum separation of the oat bran and oat flour. The preferred size screen openings for a particular grinding mill can be routinely determined taking into consideration the yield of oat bran desired. For example, with a conventional Fitz mill, screens having openings of from about 3/64 to 7/64 inch in diameter are suitably employed. With screens having the larger openings, the oat bran is retained on the screen and comprises about 40 to 50% of the groat. With screens having smaller openings, such as 3/64 inch openings, the oat bran retained on the screen comprises about 10% of the groat. The same considerations as to size of screen openings applies if the oat bran is separated from the oat flour by means of sifter screens and the like. The screen openings should be of a size so as to accomplish separation between the two fractions and preferably in the most efficient manner so as to improve yield of the oat bran. Thus, the milling and grinding and separation means can be varied by those knowledgeable in the art so as to obtain the oat bran concentrate which is the portion or fraction of the oat groat which has a crude fiber content of at least 150% the crude fiber content of the original oat groat.

A proximate analysis of typical oat bran utilized in accordance with this invention compared to the starting oat groat is shown in Table I.

TABLE I

|  | Percent (as is) | |
| --- | --- | --- |
|  | Groat | Oat Bran |
| Starch | 50–60 | 15–40 |

TABLE I-continued

| | Percent (as is) | |
|---|---|---|
| | Groat | Oat Bran |
| Protein (Nx6.25) | 16.5 | 21–22 |
| Fat | 6.2 | 7.5 |
| Moisture | 9.3 | 8.5 |
| Crude Fiber | 1.6 | 2.7 |
| Ash | 1.9 | 2.6 |
| Dietary Fiber | 6–9 | 14–30 |
| Beta Glucan | 4–6 | 8–12 |

It will be noted that the oat bran is enriched in protein, fat, crude fiber, ash, dietary fiber and gum content. Unexpectedly and notwithstanding its relatively high gum content, the oat bran is readily hydratable with hot or cold water and exhibits reduced pasting and lump characteristics when processed in accordance with this invention.

To prepare a food product in accordance with this invention, the oat bran is subjected to a cooking operation with water. The oat bran particles as produced can be subjected to the cooking operation or the oat bran particles can be further ground prior to cooking, if desired, for organoleptic or other reasons. Cooking of the oat bran with water is carried out to gelatinize the starch in the bran and to produce a plastic mass which is capable of being shaped into a desired form. For cooking, the oat bran is tempered with water to a moisture content to say about 15% to 35% or more and subjected to a temperature of about 160° to 350° F. for a period ranging from 15 to 120 seconds. The conditions of cooking so as to effect gelatinization of the starch can be varied with starch gelatinization being confirmed by methods well known in the art, such as, loss of birefringence in the starch, change in iodine affinity, or change in alkali viscosity or change in water solubility, microscopic examination and so forth. The cooking is conveniently and thus preferably accomplished by passing the oat bran admixed with water through an extruder-heat exchanger of conventional design, from which it is extruded through a die having an arrangement of closely adjacent orifices discharging a pluarlity of strands which are pliable or plastic in nature. The oat bran can be expanded or non-expanded as desired by controlling the temperature of the cooking-extruding operation and the moisture of the bran undergoing extrusion. For substantial expansion, it is generally preferred that the moisture content of the material being cooked and extruded be in the range of about 20 to 25% and the cooking temperature, i.e. the temperature at the exit end of the cooker/extruder, be about 280° to 320° F. To limit or reduce expansion during the cooking/extruding operation, the moisture content of the material is maintained at about 30% to 35% and cooking temperatures on the order of about 160° to 260° F. are utilized. Other means for cooking the oat bran known in the cereal food art can be employed, such as, for example, puffing and microwave heating. In any event, cooking is accomplished by heating the moistened oat bran to a temperature sufficient to gelatinize the starch in the presence of sufficient water to produce a plastic mass or dough which can be shaped.

After being cooked, the oat bran is in a plastic condition and capable of being shaped as is desired to form shreds, flakes, pellets, expanded hollow tubes, solid rods, etc. As is known in the art, the shaping can be accomplished principally by use of an extruder having a plurality of die orifices of such configuration so as to discharge particularly shaped strands or rods which can be cut into pieces of a size desired. The extrudate strands or rods leaving the extruder can be cut near the die orifice or fed to cutting and shaping rolls. Alternatively, the oat bran can be cooked by means other than an extruder-cooker and the cooked oat bran can be formed into a plastic sheet and cut and shaped as desired using conventional equipment and techniques known in the cereal food art. It is known that cereal type breakfast foods can be extruder cooked under conditions that a plastic, shapable mass or dough is formed, but for a very brief time, and the extrusion pressure and temperature conditions being such that the water in the extrudate is quickly flashed off, yielding an extrudate which is hard and frangible and not considered generally a plastic shapable mass. However, such extrudates from which water has been flashed off are susceptible to grinding to form particulate extrudates. Such extrudates are definitely suitable for use in accordance with this invention and herein are considered to be a plastic shapable mass or dough or the equivalent thereof. Shaping the cooked oat bran by grinding to produce finely divided particles as opposed to say flakes or shreds is particularly advantageous when producing "baby food" cereal foods intended to be fed to very young children.

The cooked, shaped oat bran in accordance with this invention is eminently suitable for use as an "instant" cereal food product. The processed oat bran is readily hydratable with either hot or cold water and exhibits the properties of cooked instant cereals. With the processed oat bran it is not necessary to further cook the cereal for a period of time with water as is required with known instant cereals. Currently available instant cereals generally require cooking with water at a temperature of at least about 80° C. for at least one minute or more. The oat bran, when used as an instant cereal, can be mixed with cold water to form a cold cereal which is organoleptically similar to a cooked cereal but which is not pasty or lumpy and which does not stick or adhere excessively to utensils. If the consumer prefers, the oat bran can be used as a hot instant cereal by the mere addition of hot water thereto without the necessity of actually further cooking the material. The hydration characteristics of the oat bran are such that a smooth, non-lumpy, non-pasty instant cereal food is obtained by simple mixing, such as by spoon mixing the processed oat bran with either hot or cold water.

The oat bran in accordance with this invention is likewise eminently suitable for use as the principal ingredient in ready-to-eat cereal foods. Thus, the cooked shaped oat bran can be employed in formulations with other desired materials, such as flavors, to produce a ready-to-eat cereal to which milk can be added. According to this embodiment, the oat bran is mixed with other ingredients including water to form a dough which is then cooked. The cooking of the oat bran in the dough formulation can be conducted as previously described heretofore with respect to the cooking of the oat bran per se. Various ingredients can be employed with the oat bran to form the dough. Such ingredients include various raw and pregelatinized flours, starches and chemically modified flours and starches such as from corn, oats, wheat, barley, rice, tapioca, proteins and protein derivatives from soybeans, cottonseed, milk, sunflower, gelatin, meat, peanut, fish, oils and fats and modified oils and fats from animal and vegetable sources such as lard, corn oil, soybean oil, coconut oil, sesame oil, vegetable gums such as carboxymethyl cellulose, methyl cellulose, guar, gum arabic, tragacanth, carageenan, pectin, alginate, sugars such as sucrose, dextrose, fructose, lactose, gelactose, maltose, inert sugars, polyhydric alcohols such as glycerine, sorbitol, propylene glycol, alcohols such as ethanol, surfactants such as monoglyceride and derivatives, lecithins, minerals including those utilized for dietary supplementation such as salt, phosphates, dietary supplements, antioxidants such as BHA, BHT, TBHQ and the like.

The choice of ingredients to employ with the oat bran to produce a ready-to-eat cereal can vary widely as is known in the cereal food art, with particular ingredients being selected to provide a desired ready-to-eat cereal.

The cereal foods containing cooked shaped oat bran are subjected to a drying operation to reduce the final moisture content to a level not exceeding about 15% and preferably not exceeding 10% and more preferably not in excess of about 5% by weight.

The cereal foods disclosed herein are distributed in packaged form as is customary with cereal foods. No special types of packaging are required and the cereal foods exhibit shelf stability normally associated with breakfast cereal food products. If the food product is to be distributed or stored under unfavorable conditions which are well recognized, edible antioxidants can be incorporated in the cereal food and/or the food can be packaged while in an environment from which oxygen has been excluded.

The following examples illustrate the invention and the advantages thereof.

EXAMPLE 1

Whole, dehulled, green oat groats containing about 10-12% moisture are steamed in an atmospheric steamer for approximately 12 minutes. The steamed oat groats are then passed through "bump" rolls having clearance therebetween of about 0.012 inches so as to fracture the oat kernels. The oat kernels are then cooled to a temperature on the order of about 80°-90° F. and then ground in a Fitz mill having screen openings of 6/64 inches. After grinding, the oat groats are passed to a sifter having 0.0213 inch screen openings. Approximately 40-50% of the oat groats, comprising the oat bran, are retained on the sifter screen.

The oat bran is then tempered to approximately 30% moisture and is passed through an Akron ¼ inch steam heated cooker-extruder. The extrusion conditions are as follows:

| | |
|---|---|
| Die: | 5/32 inch round |
| Auger speed: | 160 rpm |
| Feed zone: | cold water |
| Zone 1: | cold water |
| Zone 2: | cold water |
| Zone 3: | 50 psi steam pressure |
| Zone 4: | 100 psi steam pressure |
| Exit temperature: | 240° F. |
| Back pressure: | 50 psi |
| Feed rate is maintained such that the amperage reading is 6-8 Amps. | |

The extruded non-expanded product is then ground and dried to a moisture content of about 3-4% by weight. The product is highly satisfactory as an instant cereal food by admixing hot or cold water therewith.

EXAMPLE 2

Following the procedure of Example 1, oat bran is obtained from dehulled, green oat groats by grinding in a hammer mill having screen openings of 4/64 inch. Approximately 10% of the oat groats comprising the oat barn are retained on the sifter screen.

EXAMPLE 3

Following the procedure of Example 1, oat bran is obtained by grinding the steamed, dehulled green oat groats in a hammer mill having screen openings of 5/64 inch. Approximately 20-25% of the oat groats comprising the oat bran are retained on the sifter screen.

EXAMPLE 4

The oat bran prepared as in Examples 1, 2 and 3 was fractionated into three screen size fractions; a fraction retained on a 14 mesh screen (U.S. Sieve Series) (+14 fraction), a fraction passing through a 14 mesh but which is retained on a 25 mesh screen (−14+25 fraction) and a third fraction which passes through a 25 mesh screen (−25 fraction); these three fractions being designated large, middle and fine fractions, respectively. To 10 parts of each of the fractions were added 50 parts of hot water and 50 parts of cold water. Complete hydration occured with both hot and cold water very quickly, with the resulting food product constituting wet, non-sticking agglomerates. While there was some agglomeration of the wetted cereal, there was virtually no adhesion between small agglomerates or between the agglomerates and the container. It is noteworthy and completely unexpected that with these instant pregelatinized cereal foods no "stickiness" occurs with cold water. Known cereals containing pregelatinized starch would generally, under similar conditions, produce a very sticky mass.

EXAMPLE 5

Whole, dehulled, green oat groats containing about 10-12% moisture are steamed in an atmospheric steamer for approximately 12 minutes. The steamed oat groats are then passed through "bump" rolls having clearance therebetween of about 0.012 inch so as to fracture the oat kernels. The oat kernels are then cooled to a temperature on the order of about 80°-90° F. and then ground in a Fitz mill having screen openings of 6/64 inches. After grinding, the oat groats are passed to a sifter having 0.0213 inch screen openings. Approximately 40-50% of the oat groats, comprising the oat bran, are retained on the sifter screen.

The oat bran is then tempered to approximately 22% moisture and is passed through an Akron ¼ inch steam heated cooker-extruder. The extrusion conditions are as follows:

| | |
|---|---|
| Die: | 1/6 inch round |
| Auger speed: | 160 rpm |
| Feed zone: | cold water |
| Zone 1: | cold water |
| Zone 2: | cold water |
| Zone 3: | 25 psi steam pressure |
| Zone 4: | 150 psi steam pressure |
| Exit temperature: | 290° F. |
| Back pressure: | 250 psi |
| Feed rate is maintained such that the amperage reading is 6-8 Amps. | |

The extruded slightly expanded product is then ground wet through a Fitz mill and dried to a moisture content of about 3-4% by weight.

EXAMPLE 6

Oat bran obtained as described in Example 1 is utilized to prepare a shredded ready-to-eat cereal. This cereal employs a high percentage of the oat bran and produces a shredded cereal having a pleasant sweet taste with relatively low sugar content. Also, upon adding water to the cereal product, it maintains structural integrity and remains crisp for extended periods.

The cereal formulation is as follows:

|  | % |
| --- | --- |
| Oat bran | 73.95 |
| Wheat flour | 12.85 |
| Sugar | 9.75 |
| Salt | 1.00 |
| Glycerol | 1.00 |
| CaCo3 | 0.75 |
| Na2HPO4 | 0.50 |
| Vitamin color premix | 0.20 |
| Dry Mix | 100.00 |

A dough is formed from the above dry mix by adding 33 parts of water to 67 parts of the dry mix. The dough is then cooked and extruded in an Akron 1¼ inch steam heated extruder under the following non-expanding conditions:

| Extrusion: (Akron 1¼ steam heated extruder) | |
| --- | --- |
| Die: | 11/64" round |
| Auger speed: | 95 RPM |
| Feed zone: | cold water |
| Zone 1: | cold water |
| Zone 2: | cold water |
| Zone 3: | 75 psi steam pressure |
| Zone 4: | 100 psi steam pressure |
| Exit temperature: | 240° F. |
| Back pressure: | 0 |
| Amperage reading: | 4.0 amps. |

After extrusion the extrudate is shredded using three shredding rolls, using pressures as follows:

| 1st rolls pressure | 3800 psi |
| --- | --- |
| 2nd rolls pressure | 2000 psi |
| 3rd rolls pressure | 3500 psi |

Then the shredded product is dried for 7½ minutes in a Spooner oven using a temperature of 300° F. in drying zone 1 and drying zone 2.

The shredded cereal food prepared in accordance with this example exhibits an approximately 50% increase in bowl life as compared with a similar cereal which does not contain the oat bran. The bowl life is determined by immersion of the cereal in cold milk, eating the cereal at one minute intervals and recording the time the cereal remains substantially crisp.

EXAMPLE 7

An expanded ready-to-eat cereal containing 65% oat bran is produced as follows:

| Dry Mix Ingredients | % |
| --- | --- |
| Oat bran | 65.00 |
| Yellow corn flour | 23.50 |
| Sucrose | 10.00 |
| Salt | 1.50 |
|  | 100.00 |

Mix Moisture = 8.3%

The ingredients were blended in a ribbon type mixer and then mixed in a rotary screw feeder mixer at a ratio of 77 parts dry milk and 23 parts water by weight to form a homogeneous dough. The dough was processed on an Egan Model continuous extruder-cooker using a type 7D screw having a length to diameter ratio of 24:1. The screw was operated at 181 revolutions per minute at 18 kilowatts and was cooled internally with water at 15°-20° C. The first half of the extruder panel from the point of raw dough input was cooled with water at 15°-20° C. The last half of the panel was heated by steam in three sections at 142, 130 and 30 psig, respectively.

These conditions resulted in a cooked dough temperature of 160° C. at a manifold pressure of 2700 psig immediately before exit from a forming die. The expanded cylinder of cooked extrudate was fed continuously through cutting rolls to form hollow spheres of bite sized ready-to-eat cereal. The bite size pieces were dried in a stream of hot air for about 10 seconds.

The resulting ready-to-eat cereal had the following composition:

|  | % |
| --- | --- |
| Ash | 3.11 |
| Crude fiber | 2.36 |
| Protein (Nx6.25) | 15.3 |
| Moisture | 7.3 |

The cereal provides 4 to 5 grams of dietary fiber per one ounce serving and 0.67 gram of crude fiber per serving.

EXAMPLE 8

This example illustrates a "natural" ready-to-eat cereal. The formulation of the cereal is as follows:

|  | % |
| --- | --- |
| Oat bran | 29.23 |
| Wheat flakes | 14.01 |
| Dried almonds | 5.89 |
| Dried coconut | 6.99 |
| Non-fat dried milk | 6.99 |
| Syrup |  |
| Brown sugar | 16.68 |
| Konut oil | 10.02 |
| Honey | 1.26 |
| Water | 8.33 |
|  | 100.00 |

The cereal is prepared by premixing all dry ingredients and placing in an enrober. The syrup is then heated to 150° F. and placed in a spray gun and sprayed slowly into the dry mix while enrobing. The cereal is then placed in a Proctor/Swartz oven pan and baked for 12 minutes at 260° F. The sample is then cooled on the air drier and broken up using breaker rolls.

EXAMPLE 9

This example illustrates a Granola bar made from a cereal containing oat bran. The formulation is as follows:

|  | % |
|---|---|
| Oat bran | 29.33 |
| Wheat flakes | 14.61 |
| Almonds | 5.89 |
| Coconut | 6.99 |
| Non-fat dried milk | 6.99 |
| Syrup | |
| Brown sugar | 16.68 |
| Honey | 1.26 |
| Water | 8.33 |
| 42 DE Corn syrup | 10.02 |
|  | 100.00 |

The dry mix is placed in an enrober. Syrup, heated to 150° F., is sprayed onto the dry mix. The cereal is then placed in greased, baked Granola Bar forms and baked in a Proctor/Swartz oven at 250° F. for 21 minutes and allowed to air cool. The bars are then packaged in poly bags.

The oat bran disclosed in this invention is further characterized by its high water holding capacity. The water holding capacity of hydratability of the oat bran is considerably higher than oat flour, wheat flour and ungelatinized starchy materials. Pregelatinized starchy materials are noted for high water holding capacity (hydration index) but it is usually very difficult to mix these starchy materials with hot or cold water to form a lump-free dispersion. Quite unexpectedly, however, the oat bran disclosed herein, when cooked so as to gelatinize the starch content, exhibits a hydration index comparable to pregelatinized starchy materials but unlike which can be rapidly hydrated in either hot or cold water by simple mixing, such as by spoon mixing, to form a relatively lump-free, non-sticky dough or porridge. In Table II data are presented comparing the water holding capacity of the oat bran of this invention with other products.

TABLE II

|  | Hydration Index grams water/ grams dry solids | |
|---|---|---|
| Uncooked oat bran | 3.10 | (1) |
| Oat Flour | 2.67 | (1) |
| Wheat flour | 1.59 | (2) |
| Wheat starch | 1.97 | (3) |
| Rice starch | 1.86 | (3) |
| Potato starch | 1.84 | (3) |
| Tapioca starch | 1.72 | (3) |
| Soy Protein isolate | 3.50 | (4) |
| Soy protein concentrate | 3.10 | (4) |
| Soy flour | 2.77 | (5) |

In Table III below there is given a comparison of cooked oat bran with other cooked products.

TABLE III

|  | Extrusion Temp. | Hydration Index grams water/ grams dry solids | |
|---|---|---|---|
| Extruder cooked coarse oat bran 30% moisture | 135° C. | 5.6 | (1) |
| Extruder cooked corn grits 10.5% moisture | 225° C. | 4.4 | (6) |
| Extruder cooked corn grits 25.4% moisture | 225° C. | 6.7 | (6) |
| Extruder cooked corn starch 22.0% moisture | 70° C. | 4.9 | (6) |
| Extruder cooked corn starch 22.0% moisture | 170° C. | 8.3 | (6) |
| Extruder cooked corn starch 22.0% moisture | 225° C. | 4.9 | (6) |
| Extruder cooked wheat starch 22.0% moisture | 70° C. | 4.6 | (6) |
| Extruder cooked wheat starch 22.0% moisture | 170° C. | 7.7 | (6) |
| Extruder cooked wheat starch 22.0% moisture | 225° C. | 7.4 | (6) |
| Extruder cooked rice starch 22.0% moisture | 70° C. | 5.1 | (6) |
| Extruder cooked rice starch 22.0% moisture | 170° C. | 8.3 | (6) |
| Extruder cooked rice starch 22.0% moisture | 225° C. | 7.4 | (6) |

(1) American Association of Cereal Chemists Method 56-20.
(2) Sollars, W.F., Relation of Distilled Water Retention to Alkaline-Water Retention, Water Absorption, and Baking Properties of Wheat Flours. Cereal Chemistry 49: 168-172 (1972).
(3) Rasper, V.F., and J.M. Deman. Measurement of Hydration Capacity of Wheat Flour/Starch Mixtures. Cereal Chemistry 57(1): 27-31 (1980).
(4) Quinn, J.R., and D. Paton. A Practical Measurement of Water Hydration Capacity of Protein Materials. Cereal Chemistry 56(1): 38-40 (1979).
(5) Fleming, S.E., F.W. Sosulski, A. Kilara, and E.S. Humbert. Viscosity and Water Absorption Characteristics of Slurries of Sunflower and Soybean Flours, Concentrates and Isolates. J. Food Sci. 39: 188-191 (1974).
(6) Mercier, C. and P. Feillet. Modification of Carbohydrate Components by Extrusion-Cooking of Cereal Products. Cereal Chemistry 52 (3): 285-297 (1975).

In obtaining the data presented in the above Tables II and III, the assay methods referred to were used to determine the hydration index. All of the assay methods consist generally of placing the sample to be tested in excess water, centrifuging, removing the supernatant and weighing the hydrated residue. The hydration capacity or index is calculated as the weight of the hydrated residue divided by the sample dry weight.

Another unexpected and advantageous characteristic of hot or cold breakfast cereals containing the oat bran is the significantly reduced pastiness and stickiness of the cereals. The tendency of oat breakfast cereals when heated in the presence of water to form lumps and become very sticky is well known. However, cereal foods containing the oat bran, whether served hot or cold, exhibit significantly reduced pasting and stickiness characteristics. To illustrate this important advantage, the sticking or adhesive tendencies of a hot porridge made from oat bran and a commercially available wheat cereal were tested. According to package directions, the commercially available wheat cereal (15.5 parts by weight) was slowly stirred into 84.5 parts boiling water, the water brought to a boil again and boiling continued for 2½ minutes while stirring constantly to form a porridge type cereal. Similarly, a porridge cereal made from cooked oat bran was prepared by spoon mixing 15.5 parts of oat bran with 84.5 parts boiling water. The three porridges were evaluated for pastiness and stickiness using an Ametek Penetrometer, Model LKG-5, manufactured by the Hunter Spring Division, One Spring Avenue, Hatfield, Pa. This penetrometer consists of a movable plunger that actuates a gauge that is calibrated in fractional kilograms force. The plunger has attached thereto a circular metal disc that is 5 centimeters in diameter. In measuring adhesion, a movable metal surface is covered with a thin layer of the test cereal and the covered metal surface is pressed against the circular metal disc. The applied force is registered on the gauge and recorded. Then the covered metal surface is moved away from the circular metal disc and the force required to separate the disc and movable metal surface is registered on the gauge and recorded. The force required to separate the surfaces at the particular level of applied force is calculated and expressed as grams per square centimeter. The test results are shown in Table IV.

TABLE IV

| | HOT PORRIDGE | |
|---|---|---|
| Applied Force gms/cm$^2$ | Commercial Wheat Cereal Adhesion gms/cm$^2$ | Cooked Oat Bran Adhesion gms/cm$^2$ |
| 51.95 | 51.9 | 26.0 |
| 103.90 | 57.1 | 41.6 |
| 155.85 | 83.1 | 72.7 |

Using the same instrument as above, cold porridges made from cooked oat bran and a porridge made from 9.77% tapioca starch were tested. The tapioca starch porridge was prepared by mixing pregelatinized tapioca starch with cold tap water in a Waring blender. The oat bran porridges were prepared by spoon mixing with cold tap water. The results are shown in Table V.

TABLE V

| | COLD PORRIDGES | | |
|---|---|---|---|
| | Tapioca Starch | Cooked/Extruded Oat Bran | |
| Applied gms/cm$^2$ | 9.77% Adhesion gms/cm$^2$ | 9.77% Adhesion gms/cm$^2$ | 20% Adhesion gms/cm$^2$ |
| 51.95 | 51.9 | 7.8 | 18.2 |
| 103.90 | 77.9 | 20.8 | 41.6 |
| 155.85 | 88.3 | 20.8 | 46.7 |

In addition to food value, food products comprised of a substantial proportion of the oat bran disclosed herein may have physiological properties of significance with respect to serum cholesterol reduction. There are indications that daily consumption of the oat bran as part of a high carbohydrate fiber diet reduces serum cholesterol in adults with hypercholesterolemia. Such a diet also may contribute to a beneficial shift in the ratio of low density lipoprotein cholesterol to high density lipoprotein cholesterol.

Those modifications and equivalents which fall within the spirit of the invention are to be considered a part thereof.

What is claimed is:

1. A method of producing a pre-cooked, edible cereal food which comprises subjecting oat kernels to a milling operation, separating from the milling operation oat bran having a crude fiber content at least about 150% greater than the crude fiber content of the original oat kernels, cooking the said oat bran with water to gelatinize the starch in the oat bran and to render the cooked oat bran pliable and shapable and hydratable with water without heating, forming a plastic shapable mass from the cooked oat bran, subjecting the plastic shapable mass of cooked oat bran to a shaping operation to produce shaped pieces of cooked oat bran, drying the shaped cooked oat bran pieces to a moisture content of not more than about 10% to produce an edible cereal food which need not be subjected to further cooking prior to consumption.

2. A process in accordance with claim 1 wherein cooking of the oat bran is carried out under conditions to effect expansion of the oat bran.

3. A process in accordance with claim 1 wherein cooking of the oat bran is carried out under non-expanding conditions.

4. A process in accordance with claim 1 wherein the cooked oat bran is shaped into flakes.

5. A process in accordance with claim 1 wherein the cooked oat bran is shaped into shreds.

6. A process in accordance with claim 1 wherein the cooked oat bran is shaped by grinding to form finely divided particles.

7. A process in accordance with claim 1 wherein the oat bran is cooked in the form of a dough with a flavor imparting ingredient.

8. A process in accordance with claim 1 wherein the oat bran is subjected to extrusion.

9. An edible, pre-cooked, ready to eat cereal food readily hydratable with hot or cold water and having a moisture content of not more than about 10% comprising shaped pieces of oat bran having a crude fiber content at least about 150% greater than the crude fiber content of the original oat kernels, said bran having been cooked with water under conditions to effect gelatinization of the starch therein and to render the cooked oat bran pliable and shapable and hydratable with water without heating.

10. An edible, pre-cooked, ready to eat cereal food in accordance with claim 9 which is formed from a dough containing said oat bran as a principal ingredient thereof.

11. A cereal food in accordance with claim 9 which is shaped in flake form.

12. A cereal food in accordance with claim 9 which is shaped in shredded form.

13. A cereal food in accordance with claim 9 which is shaped in finely divided particulate form.

14. A cereal food in accordance with claim 9 which contains a flavor imparting ingredient.

15. A cereal food in accordance with claim 9 which is shaped in the form of a bar.

* * * * *